(12) United States Patent
Ichikawa et al.

(10) Patent No.: US 12,057,092 B2
(45) Date of Patent: Aug. 6, 2024

(54) INFORMATION PROCESSING DEVICE AND INFORMATION PROCESSING METHOD FOR A HEAD-MOUNTED DISPLAY

(71) Applicant: SONY GROUP CORPORATION, Tokyo (JP)

(72) Inventors: Hirotake Ichikawa, Tokyo (JP); Atsushi Ishihara, Tokyo (JP); Ryosuke Murata, Tokyo (JP); Hajime Wakabayashi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 46 days.

(21) Appl. No.: 17/756,419

(22) PCT Filed: Nov. 26, 2020

(86) PCT No.: PCT/JP2020/044031
§ 371 (c)(1),
(2) Date: May 25, 2022

(87) PCT Pub. No.: WO2021/111975
PCT Pub. Date: Jun. 10, 2021

(65) Prior Publication Data
US 2023/0005454 A1 Jan. 5, 2023

(30) Foreign Application Priority Data
Dec. 4, 2019 (JP) ................................. 2019-219694

(51) Int. Cl.
*G09G 5/38* (2006.01)
*G02B 27/01* (2006.01)
(Continued)

(52) U.S. Cl.
CPC ........... *G09G 5/38* (2013.01); *G02B 27/0172* (2013.01); *G06V 10/761* (2022.01); *G06V 40/161* (2022.01); *G06V 2201/07* (2022.01)

(58) Field of Classification Search
CPC ...... G06V 40/19; G06V 10/761; G06V 20/20; G06V 40/161; G06F 3/147; G09G 5/38;
(Continued)

(56) References Cited

U.S. PATENT DOCUMENTS

| 2013/0265232 A1 | 10/2013 | Yun et al. |
| 2015/0123997 A1 | 5/2015 | Hayasaka et al. |
| 2016/0133051 A1* | 5/2016 | Aonuma ............... G06T 19/006 345/633 |

FOREIGN PATENT DOCUMENTS

| CN | 104272371 A | 1/2015 |
| CN | 104635338 A | 5/2015 |

(Continued)

OTHER PUBLICATIONS

International Search Report and Written Opinion of PCT Application No. PCT/JP2020/044031, issued on Feb. 16, 2021, 12 pages of ISRWO.

*Primary Examiner* — Wing H Chow
(74) *Attorney, Agent, or Firm* — CHIP LAW GROUP

(57) ABSTRACT

An information processing device (1) according to an embodiment includes a display control unit (34) and a decision unit (31). The display control unit (34) displays a content image on a head-mounted display. During display of the content image by the display control unit (34), the decision unit (31) decides whether or not a surrounding person exists in a front direction of the head-mounted display on the basis of a camera image obtained by capturing an image of a surrounding environment of the head-mounted display. In a case where the decision unit (31) decides that
(Continued)

a surrounding person exists, the display control unit (34) moves a display position of the content image.

17 Claims, 9 Drawing Sheets

(51) Int. Cl.
*G06V 10/74* (2022.01)
*G06V 40/16* (2022.01)

(58) Field of Classification Search
CPC ...... H04N 13/344; H04N 5/66; G02B 27/017; G02B 27/0172; G06T 19/00
See application file for complete search history.

(56) References Cited

FOREIGN PATENT DOCUMENTS

| | | |
|---|---|---|
| EP | 2657929 A2 | 10/2013 |
| JP | 2007-304721 A | 11/2007 |
| JP | 2015-087909 A | 5/2015 |
| JP | 2015-090635 A | 5/2015 |
| JP | 2015-518580 A | 7/2015 |
| JP | 2017-149335 A | 8/2017 |
| KR | 10-2013-0113902 A | 10/2013 |
| WO | 2013/154295 A1 | 10/2013 |
| WO | 2014/156388 A1 | 10/2014 |

\* cited by examiner

| Sc11 | Sc12 | | Sc1n | Sc1m |
|------|------|---|------|------|
| Sc21 | Sc22 | | Sc2n | Sc2m |
| Sc31 | Sc32 | | Sc3n | Sc3m |
| Sc41 | Sc42 | | Sc4n | Sc4m |
| Sc51 | Sc52 | | Sc5n | Sc5m |

INFORMATION PROCESSING DEVICE AND INFORMATION PROCESSING METHOD FOR A HEAD-MOUNTED DISPLAY

CROSS REFERENCE TO RELATED APPLICATIONS

This application is a U.S. National Phase of International Patent Application No. PCT/JP2020/044031 filed on Nov. 26, 2020, which claims priority benefit of Japanese Patent Application No. JP 2019-219694 filed in the Japan Patent Office on Dec. 4, 2019. Each of the above-referenced applications is hereby incorporated herein by reference in its entirety.

FIELD

The present invention relates to an information processing device, an information processing method, and an information processing program.

BACKGROUND

Conventionally, there is an information processing device that provides virtual reality for a wearer of a head-mounted display. A field of view of the wearer is optically blocked during display of content by the head-mounted display.

There is disclosed a technology that, in a case where a surrounding person who attempts to communicate with the wearer is detected on the basis of an external situation of the head-mounted display, notifies the wearer of existence of the detected surrounding person (see, for example, Patent Literature 1).

CITATION LIST

Patent Literature

Patent Literature 1: WO 2014/156388 A

SUMMARY

Technical Problem

In such a head-mounted display, it is not easy for a surrounding person to determine which one of the content and a real space the wearer is viewing even if the wearer is viewing content displayed on the head-mounted display.

Therefore, the surrounding person may feel that the wearer of the head-mounted display gazes at the surrounding person himself/herself even if the wearer is viewing a content image displayed on the head-mounted display. This may give an unpleasant feeling to the surrounding person.

The present invention has been made in view of the above, and an object thereof is to provide an information processing device, an information processing method, and an information processing program capable of reducing an unpleasant feeling given to a surrounding person.

Solution to Problem

In order to Solve the above Problem, and achieve the object, an information processing device according to an embodiment includes a display control unit and a decision unit. The display control unit displays a content image on a head-mounted display. During display of the content image by the display control unit, the decision unit decides whether or not a surrounding person exists in a front direction of the head-mounted display on the basis of a camera image obtained by capturing an image of a surrounding environment of the head-mounted display. In a case where the decision unit decides that a surrounding person exists, the display control unit moves a display position of the content image.

Advantageous Effects of Invention

According to one aspect of the embodiment, it is possible to reduce an unpleasant feeling given to a surrounding person.

DESCRIPTION OF EMBODIMENTS

Hereinafter, embodiments of the present disclosure will be described in detail with reference to the drawings. In each of the following embodiments, the same parts are denoted by the same reference signs, and redundant description will be omitted.

Figure 1:
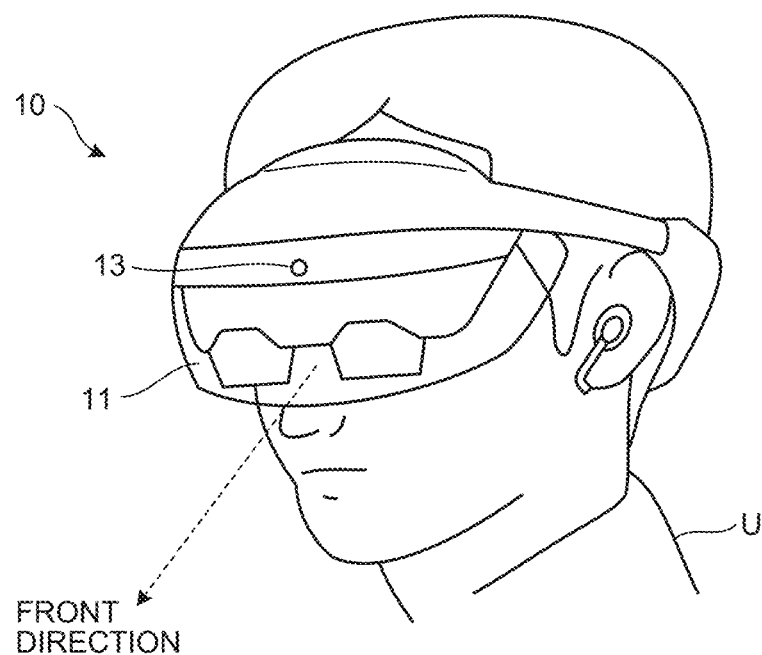
FIG. 1 illustrates an example of an external appearance of a display device according to an embodiment.
Figure 2:
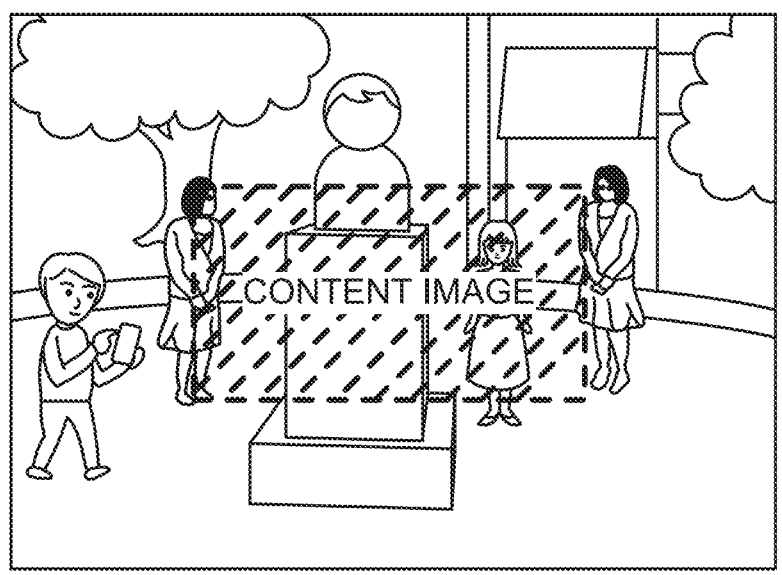
FIG. 2 illustrates an example of a field of view of a wearer.
Figure 3:
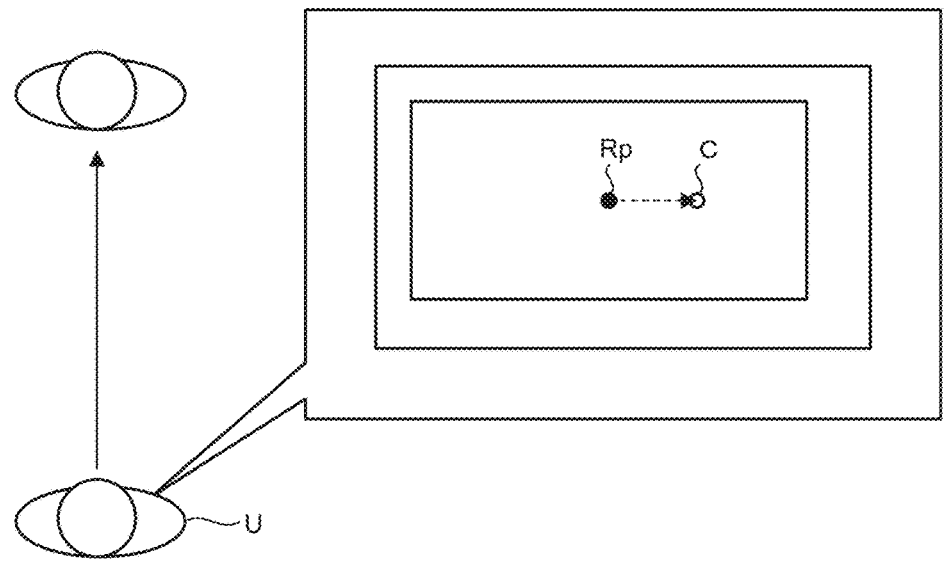
FIG. 3 illustrates an outline of an information processing method according to an embodiment.

First, an outline of a display device according to an embodiment will be described with reference to FIGS. 1 to 3. FIG. 1 illustrates an example of an external appearance of the display device according to the embodiment. FIG. 2 illustrates an example of a field of view of a wearer. FIG. 3 illustrates an outline of an information processing method according to the embodiment.

In the example of FIG. 1, a display device 10 is a head-mounted display (hereinafter, also referred to as the HMD). More specifically, the display device 10 is a so-called optical transmissive HMD including a display unit 11 having optical transmissivity.

In the example of FIG. 1, the display device 10 also includes a camera 13 in the vicinity of the display unit 11. The camera 13 captures an image at an angle of view corresponding to a field of view of a wearer U wearing the display device 10.

As illustrated in FIG. 2, in a case where a content image is displayed on the HMD, the field of view of the wearer U is optically blocked by the content image. The content image herein is a concept including both a still image and a moving image. In this type of HMD, a light shielding member (not illustrated) is generally provided in order to secure luminance of the display unit 11. The light shielding member can be a light control element that can adjust transmittance in accordance with a change in luminance of external light.

Therefore, the field of view (eye movement) of the wearer U of the HMD cannot be confirmed by a surrounding person existing around the wearer U. That is, the field of view of the wearer U is blocked while the wearer U is viewing the content image, and thus the wearer U is less likely to notice the surrounding person, and the surrounding person cannot recognize where the wearer U is looking.

Therefore, in some cases, the surrounding person feels that the wearer is gazing at the surrounding person himself/herself while the wearer U is viewing the content image. However, the wearer U cannot notice the surrounding person and may give an unpleasant feeling to the surrounding person.

Therefore, in the information processing method according to the embodiment, in a case where a surrounding person exists in a front direction of the HMD, a posture of the wearer U, that is, the front direction of the HMD is changed by moving a display position of image content displayed on the display device 10.

Specifically, as illustrated in FIG. 3, in a case where the surrounding person exists in the front direction of the wearer U, that is, in the front direction of the HMD, center coordinates C of a content image displayed on the display device 10 are moved in a predetermined direction from initial coordinates Rp indicating the center of a display region of the display device 10. Note that whether or not a surrounding person exists can be decided on the basis of a camera image captured by the camera 13.

FIG. 3 illustrates an example where the center coordinates C are moved rightward from the initial coordinates Rp. When the center coordinates C are moved, the wearer U moves his/her line of sight in accordance with the moved center coordinates C.

At this time, the wearer U can comfortably view the content image when the center coordinates C substantially match the initial coordinates Rp, and therefore it is expected that the wearer U performs an action of changing his/her posture such that the center coordinates C substantially match the initial coordinates Rp. That is, it is expected that the wearer U changes the posture by following the center coordinates C such that the initial coordinates Rp substantially match the center coordinates C.

Therefore, in the example of FIG. 3, it is expected that the wearer U rotates his/her head rightward such that the initial coordinates Rp overlap with the center coordinates C. When the head of the wearer U rotates, the front direction of the HMD rotates, and thus no surrounding person exists in the front direction after the rotation.

That is, the information processing method according to the embodiment prompts the wearer U to change the posture in a direction different from a direction of the surrounding person who has originally existed in the front direction of the HMD, thereby reducing an unpleasant feeling given by the wearer U to the surrounding person.

Figure 4:
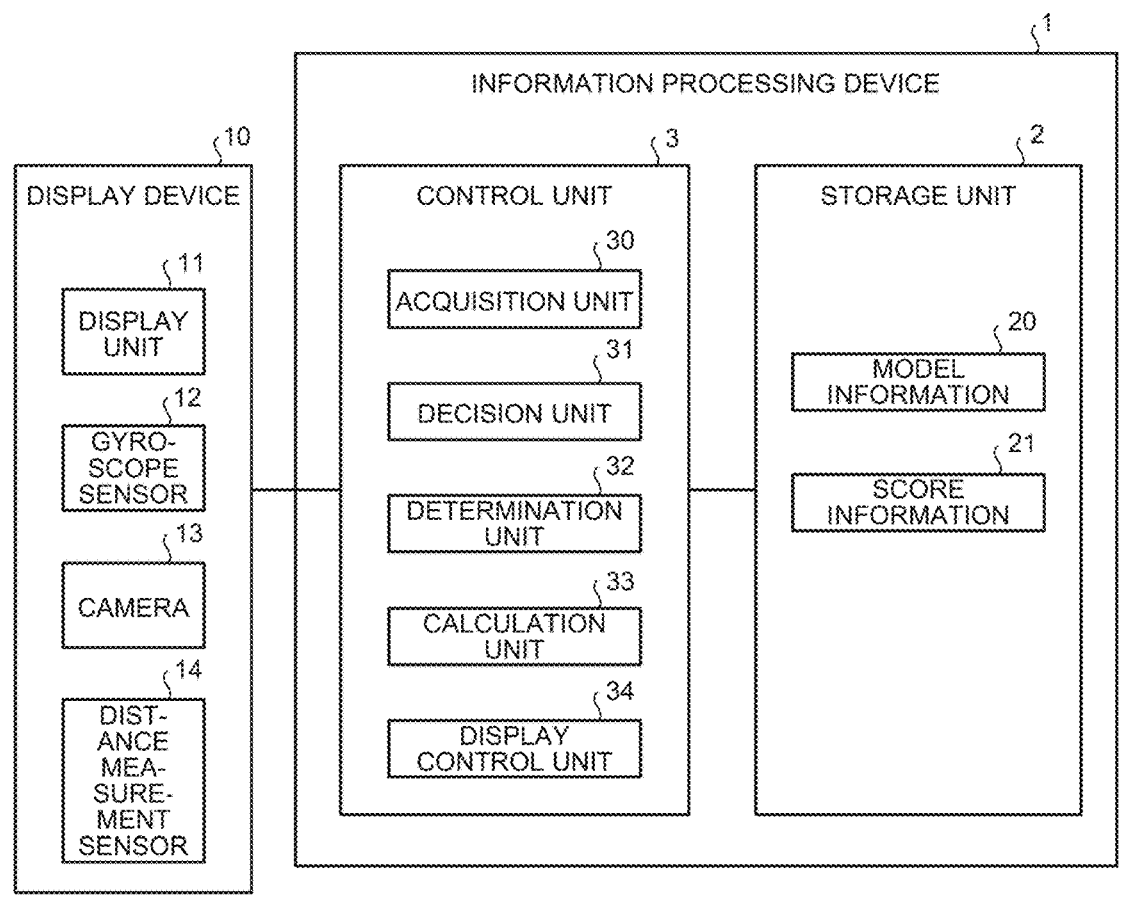
FIG. 4 is a block diagram of an information processing device according to an embodiment.

Next, a configuration example of an information processing device 1 according to the embodiment will be described with reference to FIG. 4. FIG. 4 is a block diagram of the information processing device 1 according to the embodiment. FIG. 4 also illustrates the display device 10. The information processing device 1 and the display device 10 can bidirectionally transmit and receive data in a wireless or wired manner.

First, the display device 10 will be described. As illustrated in FIG. 4, the display device 10 includes the display unit 11, a gyroscope sensor 12, the camera 13, and a distance measurement sensor 14. The display unit 11 includes, for example, a one-way mirror, has a light transmissive display surface (lens), and displays a content image input from the information processing device 1. More specifically, the display unit 11 repeats total reflection of the content image replicated on a display (not illustrated) in the lens, thereby projecting the content image toward eyeballs of the wearer U.

The gyroscope sensor 12 detects angular velocities in three axes for detecting movement of the display device 10. Because the display device 10 is the HMD as described above, the gyroscope sensor 12 detects a change in the posture of the wearer U of the display device 10 and outputs a posture signal corresponding to the detected change in the posture to the information processing device 1.

The camera 13 includes an image sensor and captures an image of an area in front of the display device 10. The camera 13 preferably includes a wide-angle lens such as a fisheye lens. For example, the camera 13 captures an image at an angle of view corresponding to the field of view of the wearer U wearing the HMD, captures a captured camera image, and outputs the captured image to the information processing device 1.

The distance measurement sensor 14 is an example of a sensor for sensing a surrounding environment of the display unit 11 and is, for example, a time-of-flight (ToF) sensor. Instead of the distance measurement sensor 14, the image sensor of the camera 13 may be regarded as a sensor for measuring the surrounding environment. That is, in a case where a distance from a surrounding person can be measured by image analysis, the image sensor may implement a function of the distance measurement sensor 14.

Next, the information processing device 1 will be described. As illustrated in FIG. 4, the information processing device 1 includes a storage unit 2 and a control unit 3. The information processing device 1 may also include a communication unit (not illustrated) for performing wireless or wired communication with an external device and an operation unit (not illustrated) for accepting a user operation.

The storage unit 2 is implemented by, for example, a semiconductor memory element such as a RAM or a flash memory or a storage device such as a hard disk or an optical disk. In the example of FIG. 4, the storage unit 2 stores model information 20 and score information 21.

The model information 20 is information regarding a model for detecting a predetermined target object from a camera image captured by the camera 13. For example, a feature value of each target object in the camera image is stored in the storage unit 2 as the model information 20.

The score information 21 is information regarding a score for determining a destination in a case where the display position of the content image is moved. A specific example of the score information 21 will be described later with reference to FIG. 10.

Next, the control unit 3 will be described. The control unit 3 is implemented by, for example, a central processing unit (CPU) or a micro processing unit (MPU) executing a program stored in the information processing device 1 by using a random access memory (RAM) or the like as a work area. The control unit 3 is a controller and may also be implemented by, for example, an integrated circuit such as an application-specific integrated circuit (ASIC) or a field programmable gate array (FPGA).

As illustrated in FIG. 4, the control unit 3 includes an acquisition unit 30, a decision unit 31, a determination unit 32, a calculation unit 33, and a display control unit 34 and implements or executes a function and effect of information processing described below. An internal configuration of the control unit 3 is not limited to the configuration in FIG. 4 and may be another configuration as long as the configuration performs the information processing described below. The control unit 3 may be connected to a predetermined network in a wired or wireless manner by using, for example, a network interface card (NIC) and receive various types of information from an external server or the like via the network.

The acquisition unit 30 acquires various types of information input from the display device 10. Specifically, the acquisition unit 30 acquires a posture signal from the gyroscope sensor 12 and acquires a camera image from the camera 13.

During display of the content image by the display control unit 34, the decision unit 31 decides whether or not a surrounding person exists in the front direction of the display device 10 on the basis of a camera image obtained by capturing an image of the surrounding environment of the display device 10.

For example, the decision unit 31 detects a person appearing in the camera image captured by the camera 13 on the basis of the feature value registered in the model information 20, and, in a case where the detected person is in the front direction of the display device 10, the decision unit 31 decides that a surrounding person exists in the front direction of the display device 10.

Figure 5:
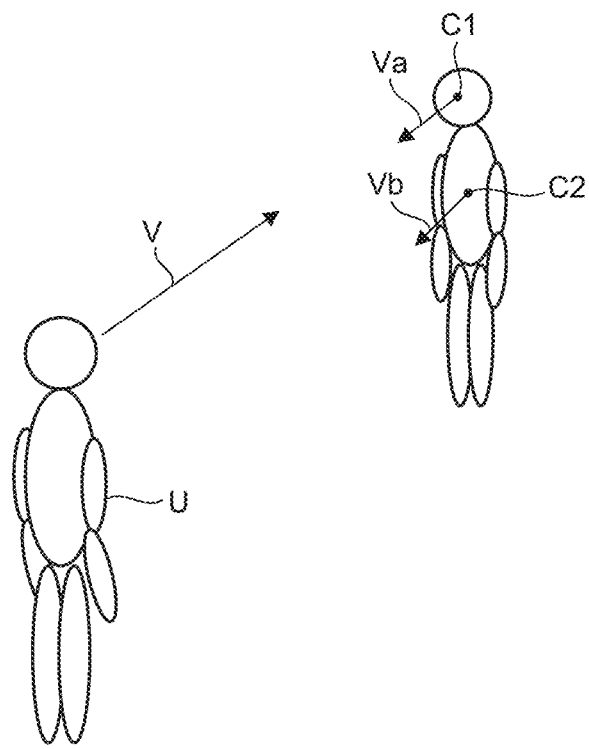
FIG. 5 is a schematic diagram of processing by a decision unit according to an embodiment.
Figure 6:
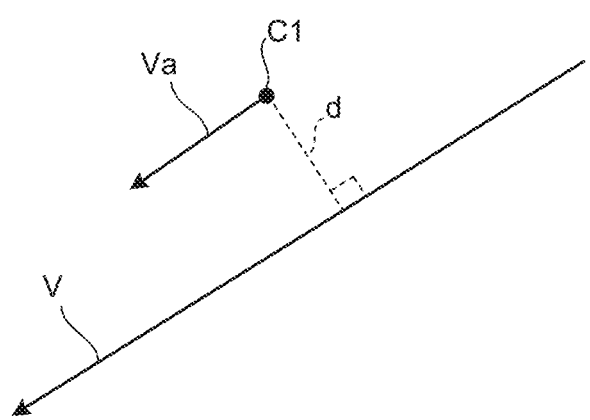
FIG. 6 is a schematic diagram of processing by a decision unit according to an embodiment.
Figure 7:
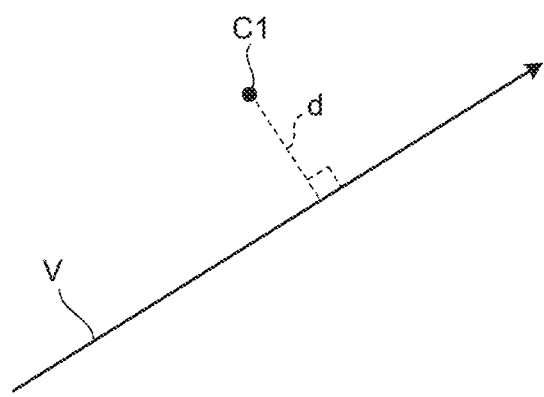
FIG. 7 is a schematic diagram of processing by a decision unit according to an embodiment.

At this time, the decision unit 31 may decide that a surrounding person exists in a case where the decision unit 31 detects a person satisfying a predetermined decision condition. A specific example of processing by the decision unit 31 will be described with reference to FIGS. 5 to 7. FIGS. 5 to 7 are schematic diagrams of the processing by the decision unit 31 according to the embodiment.

Hereinafter, the front direction of the display device 10 may also be referred to as a front vector V. As illustrated in FIG. 5, the decision unit 31 detects not only a person but also a specific part of an object from the camera image and calculates a direction of the specific part.

In the example of FIG. 5, a specific part C1 is a face of the surrounding person, a line-of-sight vector Va indicates a direction of the specific part C1, that is, a direction of a line of sight (face) of the person, a specific part C2 is the center of his/her body, and a direction vector Vb indicates a direction of the specific part C2. The specific parts are not limited to the above examples and may be other parts. For example, in a case where the person is a woman, a chest or buttocks of the woman may be set as the specific parts.

When detecting the specific parts, the decision unit 31 calculates a relative position between the display device 10 and each specific part. At this time, for example, the decision unit 31 may calculate the relative position on the basis of a measurement result of the distance measurement sensor 14 in FIG. 4 or may calculate the relative position on the basis of the camera image.

Then, the decision unit 31 decides whether or not the person satisfies the predetermined decision condition, and, when deciding that the predetermined decision condition is satisfied, the decision unit 31 decides that a surrounding person exists in the front direction of the display device 10.

In the example of FIG. 5, in a case where a state in which an angle error between the front vector V and the line-of-sight vector V1 is equal to or less than a predetermined value and a distance d between the front vector V and the specific part C1 is equal to or less than a predetermined value continues for a certain period of time, the decision unit 31 decides that a surrounding person exists in the front direction of the display device 10.

The distance d between the front vector V and the specific part C1 corresponds to a length of a perpendicular line from the specific part C1 toward the front vector V. In the example of FIG. 5, in a case where a state in which the wearer U and the person seem to face each other continues for a certain period of time, the decision unit 31 decides that a surrounding person exists in the front direction of the display device 10.

In other words, in the decision unit 31, the decision condition is satisfied in a case where the surrounding person notices a situation in which the wearer U seems to gaze at the surrounding person. Hereinafter, the above decision condition will also be referred to as a line-of-sight condition.

At this time, the decision condition may be satisfied without considering the direction of the surrounding person. Specifically, as illustrated in FIG. 6, in a case where a state in which the distance d between the front vector V and the specific part C1 is equal to or less than a predetermined value continues for a certain period of time, the decision unit 31 decides that a surrounding person exists in the front direction of the display device 10.

In other words, in a case where the person stops for a predetermined period of time or more in the front direction of the display device 10, the decision unit 31 decides that a surrounding person exists. In this case, in a case where a situation in which the wearer U seems to gaze at a specific part of the surrounding person occurs, the decision unit 31 decides that a surrounding person exists in the front direction of the display device 10. Hereinafter, the above decision condition will also be referred to as a distance condition.

Returning to the description of FIG. 4, the determination unit 32 will be described. In a case where the display control unit 34 moves the display position of the content image, the determination unit 32 determines a destination of the display position on the basis of the camera image.

That is, in a case where the decision unit 31 decides that a surrounding person exists in the front direction of the display device 10, the determination unit 32 determines the destination of the display position of the content image on the basis of the camera image captured by the camera 13.

Figure 8:
FIG. 8 illustrates an example of detection processing by a determination unit according to an embodiment.
Figures 9, 10:
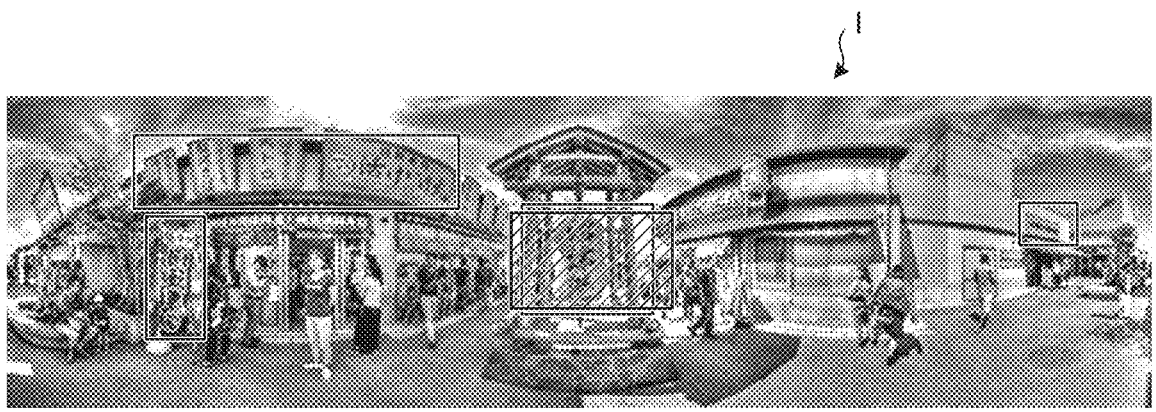
FIG. 9 illustrates an example of detection processing by a determination unit according to an embodiment.
FIG. 10 illustrates an example of score information according to an embodiment.

A series of processing by the determination unit 32 will be described with reference to FIGS. 8 to 10. FIGS. 8 and 9 illustrate an example of detection processing by the determination unit 32 according to the embodiment. FIG. 10 illustrates an example of the score information 21 according to the embodiment.

As illustrated in FIG. 8, based on a camera image I captured by the camera 13, the determination unit 32 detects people appearing in the camera image I. In the example of FIG. 8, the people detected by the determination unit 32 are marked.

At this time, the determination unit 32 detects not only the people appearing in the camera image I but also a direction of each person. In other words, the determination unit 32 distinctively detects people facing the wearer U and people facing other directions.

As illustrated in FIG. 9, the determination unit 32 detects feature objects that satisfy a visual condition indicating a visual feature among objects appearing in the camera image I. The object herein refers to all things appearing in the camera image I, and the feature object refers to an object that has a predetermined visual feature and is likely to draw attention among the objects.

In the example of FIG. 9, a sightseeing monument, a signboard, and the like correspond to the feature objects. In other words, the feature object is an object that can easily draw attention of people existing around the object and is an object in which, in a case where the feature object exists in the front direction of the wearer U, it is expected that the surrounding person thinks that the wearer U is looking not at the surrounding person but at the feature object.

Examples of other feature objects include predetermined monuments such as a bronze statue and crowds. A feature value of the feature object satisfying the visual condition may be registered in advance, and an object having the feature value may be detected from the camera image I as the feature object, or the feature object may be detected on the basis of lines of sight of the people appearing in the camera image I.

In this case, in a case where a plurality of people appearing in the camera image I are gazing at a predetermined object, this object is detected as the feature object. Further, a position of the feature object may be registered in a map in advance, and the feature object may be detected on the basis of a relative positional relationship with a current location of the wearer U on the basis of the map.

When detecting the people or feature objects appearing in the camera image I, the determination unit 32 calculates a score on the basis of each detection result. Specifically, as illustrated in FIG. 10, the field of view of the wearer U is divided into a plurality of regions, and the score is calculated for each divided region.

As an example of a method of calculating the score, a point is deducted in a region where a person exists, and a point is further deducted in a region where a person facing the wearer U exists, whereas a point is added in a region where a feature object exists.

Then, for example, the determination unit 32 determines a region having the lowest score as the destination of the display position of the image content, that is, the destination of the center coordinates C in FIG. 3. That is, the destination of the center coordinates C is determined on the basis of the people appearing in the camera image I, and thus a region where no person exists is preferentially determined as the destination of the center coordinates C, and, in a case where a plurality of people exist, a region where a person who is not looking at the wearer U exists is preferentially determined as the destination of the center coordinates C.

That is, the determination unit 32 determines a direction in which no person satisfying the decision condition exists in the front direction of the moved HMD as the destination of the center coordinates C, thereby reducing a frequency of moving the content image.

Further, the determination unit 32 determines the destination of the center coordinates C on the basis of the feature object, and thus it is possible to make people around the wearer think that the wearer U is looking at the feature object. Therefore, this makes it possible to eliminate an unpleasant feeling itself that the wearer U gives to the surrounding people.

Note that, depending on the kind of the feature object, the surrounding people may feel strange if the wearer U is gazing at the feature object for too long. Therefore, in a case where a predetermined time elapses after the feature object comes in the front direction of the HMD, the destination of the center coordinates C may be determined again.

Returning to the description of FIG. 4, the calculation unit 33 will be described. For example, the calculation unit 33 calculates an amount of change in the posture of the wearer U on the basis of the detection result of the gyroscope sensor 12. Specifically, the calculation unit 33 calculates an amount of rotation of the head of the wearer as the amount of change on the basis of a posture signal input from the gyroscope sensor 12.

In a case where the decision unit 31 decides that the decision condition is satisfied, the display control unit 34 described later moves the center coordinates C of the content image from the initial coordinates Rp. In this case, if the head of the wearer U does not rotate, a situation in which the wearer U seems to gaze at the surrounding person continues.

Therefore, the calculation unit 33 calculates the amount of rotation of the head of the wearer U when the center coordinates C are moved and notifies the display control unit 34 in a case where, for example, the calculated amount of rotation exceeds a threshold. The threshold herein indicates an amount required for an initial surrounding person to deviate from the front direction of the HMD, but, for example, may be determined on the basis of the destination determined by the determination unit 32. That is, in a case where the front direction of the HMD becomes close to the destination determined by the determination unit 32, it may be determined that the amount of rotation exceeds the threshold.

In a case where the decision unit 31 decides that a surrounding person exists in the front direction of the HMD, the display control unit 34 moves the display position of the content image. At this time, the initial coordinates Rp are set at the center of the display region of the display device 10 as described above.

Therefore, the display control unit 34 moves the center coordinates C such that the distance between the initial coordinates Rp and the center coordinates C increases. Further, the display control unit 34 moves the center coordinates C to the destination determined by the determination unit 32.

At this time, for example, when the center coordinates C are rapidly moved from the initial coordinates Rp, visibility of the content image may be impaired in accordance with the display position of the content image. In this case, if the wearer U rapidly rotates the head with the movement of the center coordinates C, the wearer U greatly averts his/her eyes from the surrounding person, and this may give a sense of distrust to the surrounding person.

Therefore, in order to move the display position of the content image, the display control unit 34 preferably moves the display position such that a moving speed of the content image is equal to or less than a predetermined value and moves the display position such that the distance between the display position before the movement and the display position after the movement falls within a predetermined range.

Figure 11:
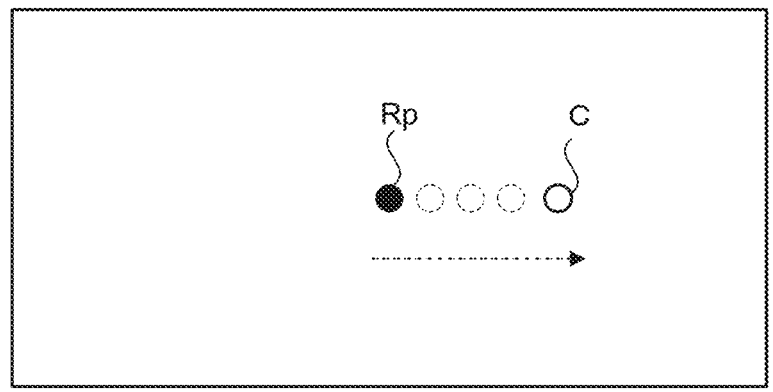
FIG. 11 is a transition diagram of center coordinates during movement of a display position.
Figure 12:
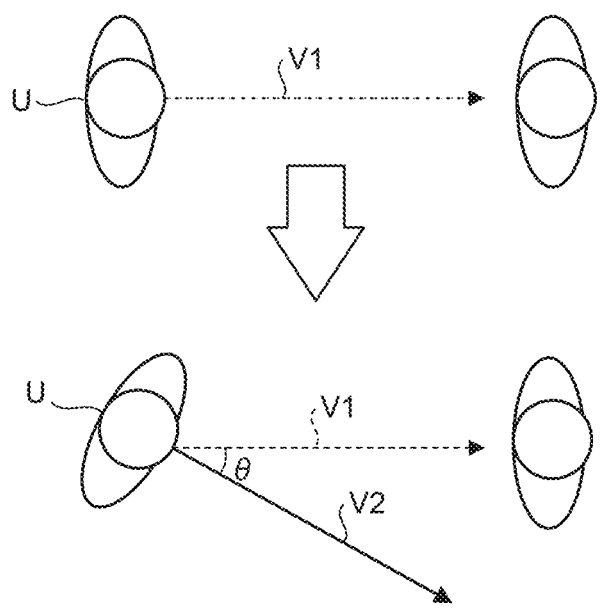
FIG. 12 illustrates an example of an amount of rotation of a head.

FIG. 11 is a transition diagram of the center coordinates C during the movement of the display position. FIG. 12 illustrates an example of the amount of rotation of the head.

As illustrated in FIG. 11, for example, the center coordinates C of the content image are moved rightward from the initial coordinates Rp. In this case, the display control unit 34 constantly moves the center coordinates C such that the moving speed of the center coordinates C is equal to or less than the predetermined value and the distance between the center coordinates C before and after the movement is equal to or less than the predetermined value.

This makes it possible to reduce an unpleasant feeling given to a surrounding person without impairing the visibility of the content image, and thus it is possible to minimize the amount of rotation of the head of the wearer U. In a period in which the center coordinates C shift from the initial coordinates Rp, the wearer U is expected to rotate the head, whereas, in a case where the shift between the center coordinates C and the initial coordinates Rp is sufficiently small, the wearer U is assumed to move only the line of sight to the center coordinates C without rotating the head.

Therefore, the distance between the initial coordinates Rp and the moved center coordinates C is preferably equal to or more than a predetermined value. In this case, the display control unit 34 may acquire the amount of rotation of the head from the calculation unit 33 every time the center coordinates C are moved, and, only in a case where the head is not rotated, the display control unit 34 may move the center coordinates C to the next display position.

Thereafter, as illustrated in FIG. 12, in a case where an amount of rotation θ of the front vector V before and after the movement of the display position exceeds the threshold, the display control unit 34 moves the center coordinates C to the initial coordinates Rp. In other words, in a case where the head of the wearer U faces a desired direction, the display control unit 34 returns the center coordinates C to the initial coordinates Rp, thereby stopping the rotation of the head of the wearer U.

Figure 13:
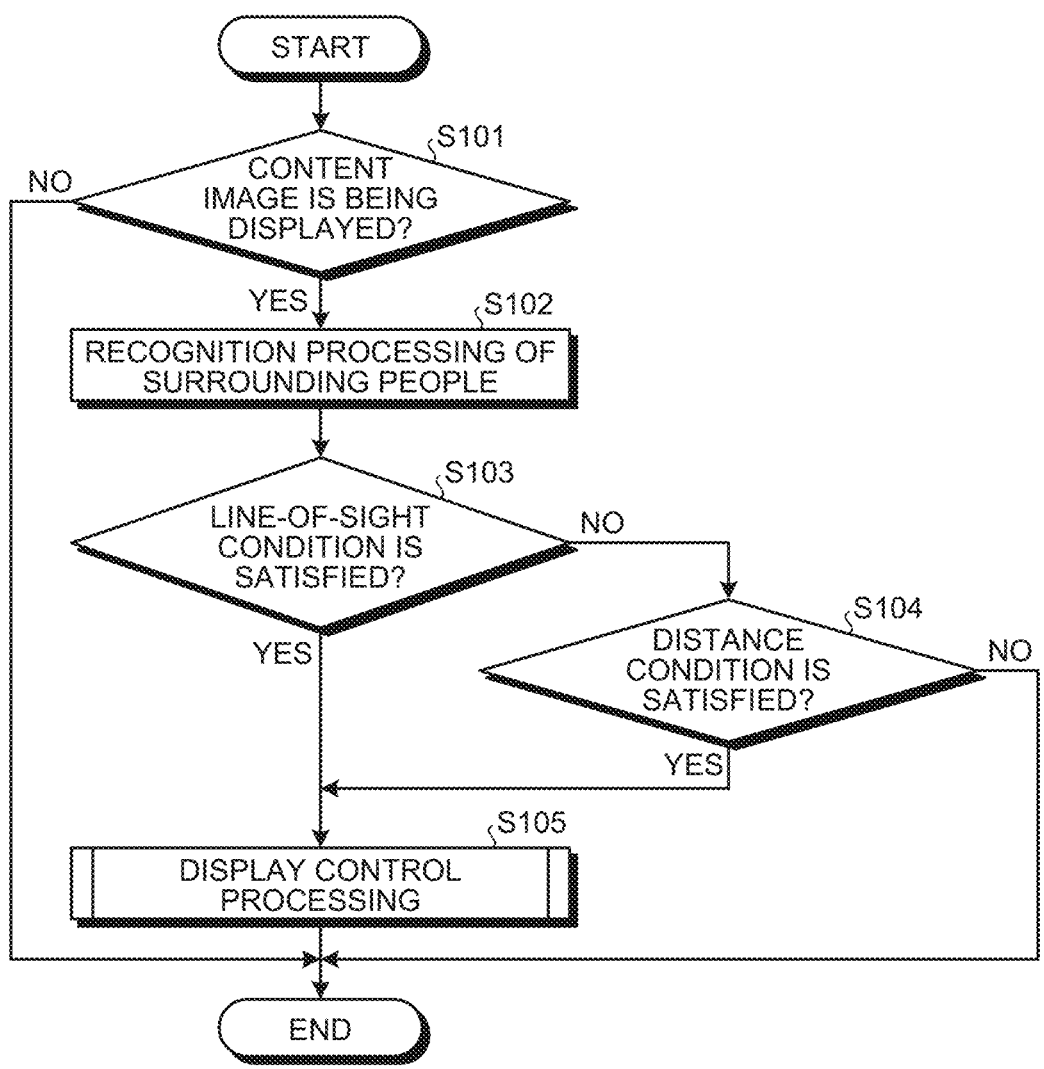
FIG. 13 is a flowchart of a processing procedure executed by an information processing device according to an embodiment.
Figure 14:
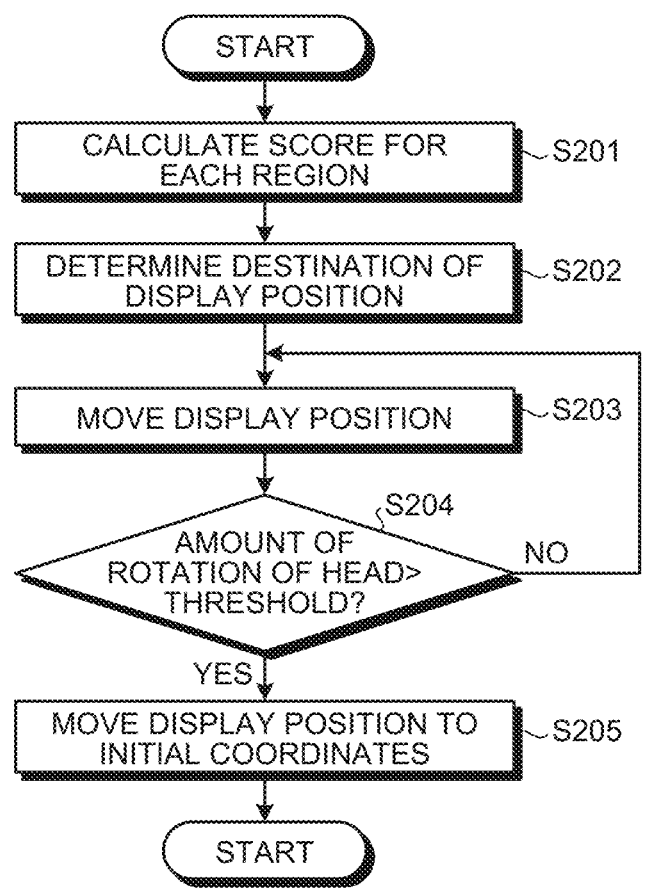
FIG. 14 is a flowchart of a processing procedure in step S105 of FIG. 13.

Next, a processing procedure executed by the information processing device 1 according to the embodiment will be described with reference to FIGS. 13 and 14. FIG. 13 is a flowchart of a processing procedure executed by the information processing device 1 according to the embodiment. FIG. 14 is a flowchart of a processing procedure in step S105 of FIG. 13. The following processing procedure is repeatedly executed by the control unit 3.

As illustrated in FIG. 13, the information processing device 1 first decides whether or not a content image is being displayed (step S101). In a case where the content image is being displayed (Step S101, Yes), the information processing device 1 performs recognition processing of surrounding people on the basis of a camera image (step S102).

Then, the information processing device 1 decides whether or not the line-of-sight condition in FIG. 6 is satisfied on the basis of a result of the recognition processing of the surrounding people (step S103). In a case where the information processing device 1 decides that the line-of-sight condition is satisfied in the decision in step S103 (Step S103, Yes), the information processing device 1 proceeds to display control processing (step S105) and terminates the processing.

In a case where the information processing device 1 decides that the line-of-sight condition is not satisfied in the decision processing in step S103 (Step S103, No), the information processing device 1 decides whether or not the distance condition in FIG. 7 is satisfied (step S104).

In a case where the distance condition is satisfied in the decision in step S104 (step S104, Yes), the information processing device 1 proceeds to the processing in step S105. In a case where the information processing device 1 decides that the distance condition is not satisfied (step S104, No), the information processing device 1 terminates the processing. In a case where the content image is not displayed in the decision in step S101 (step S101, No), the information processing device 1 omits the processing in step S102 and the subsequent steps and terminates the processing.

Next, the processing procedure in step S105 in FIG. 13 will be described with reference to FIG. 14. As illustrated in FIG. 14, the information processing device 1 calculates a score for each region on the basis of a person or feature object appearing in the camera image (step S201).

Then, the information processing device 1 determines a destination of a display position of image content on the basis of the score of each region (step S202) and moves the display position to the determined destination (step S203).

Then, the information processing device 1 decides whether or not the amount of rotation of the head of the wearer U is larger than the threshold (step S204) and, in a case where the amount of rotation exceeds the threshold (step S204, Yes), the information processing device 1 moves the display position to the initial coordinates Rp (step S205) and terminates the processing.

In a case where the amount of rotation is less than the threshold in the decision in step S204 (step S204, No), the information processing device 1 proceeds to the processing in step S203.

MODIFICATION EXAMPLE

The above embodiment shows that, in a case where a surrounding person exists in the front direction of the HMD, the display position of the content image is moved to guide the line of sight of the wearer U. However, the present invention is not limited thereto. That is, the wearer U may be notified of the existence of the surrounding person by a warning image or a warning sound. In this case, the transmittance of a part of or the entire content image may be increased to cause the wearer U to directly and visually recognize the surrounding person.

Further, the above embodiment shows a case where the display device 10 is an optical see-through display device. However, the present invention is not limited thereto and is similarly applicable to a video see-through display device.

Figure 15:
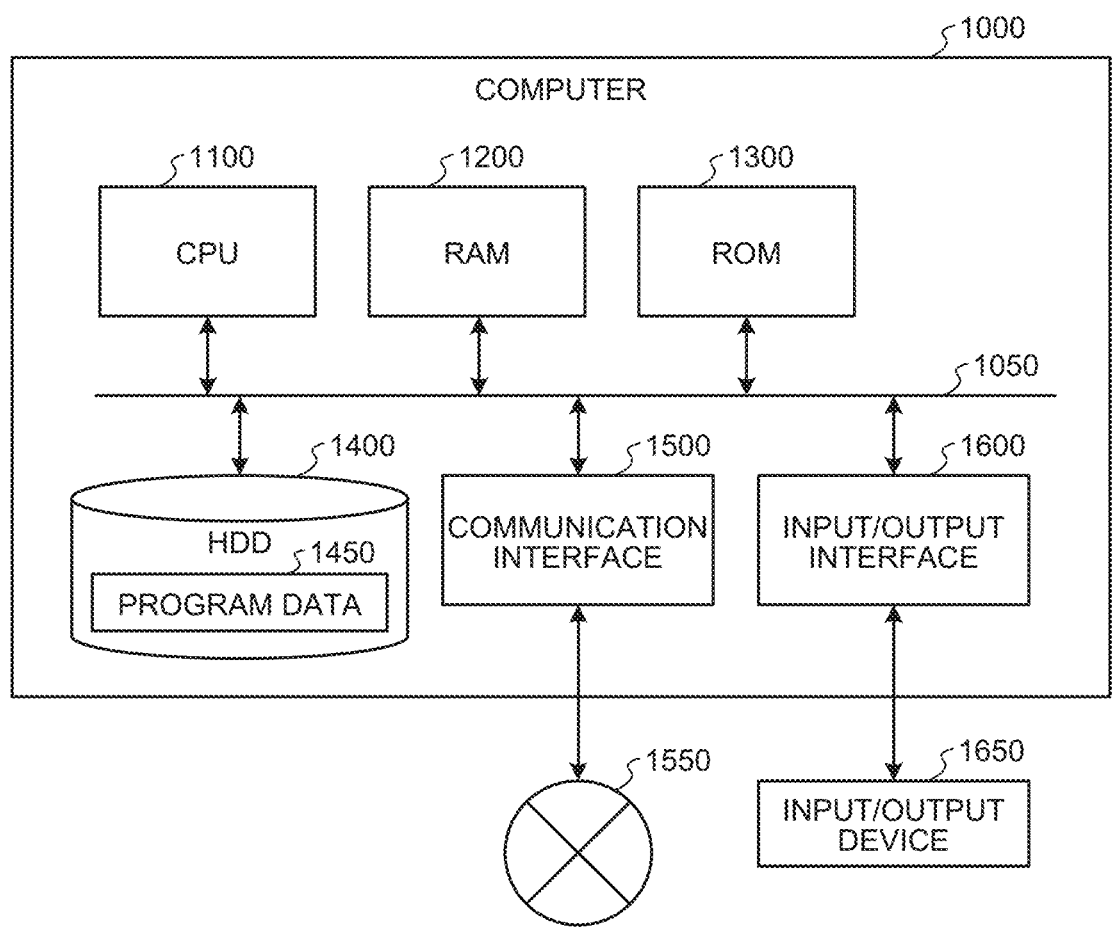
FIG. 15 is a hardware configuration diagram illustrating an example of a computer that implements functions of an information processing device.

An information device such as the information processing device according to each embodiment described above is implemented by, for example, a computer 1000 having a configuration of FIG. 15. Hereinafter, the information processing device 1 according to the embodiment will be described as an example. FIG. 15 is a hardware configuration diagram illustrating an example of the computer 1000 that implements functions of the information processing device 1. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, thereby controlling each unit. For example, the CPU 1100 develops the programs stored in the ROM 1300 or the HDD 1400 in the RAM 1200 and executes processing corresponding to the various programs.

The ROM 1300 stores a boot program such as a basic input output system (BIOS) executed by the CPU 1100 at the time of activation of the computer 1000, a program depending on hardware of the computer 1000, and the like.

The HDD 1400 is a computer-readable recording medium that non-transitorily records programs executed by the CPU 1100, data used by the programs, and the like. Specifically, the HDD 1400 is a recording medium that records programs according to the present disclosure serving as an example of program data 1450.

The communication interface 1500 is an interface for connecting the computer 1000 to an external network 1550 (e.g., the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the information processing device 1 according to the embodiment, the CPU 1100 of the computer 1000 implements a function of the acquisition unit 30 by executing a program loaded on the RAM 1200. The HDD 1400 stores a program according to the present disclosure and data in the storage unit 2. The CPU 1100 reads the program data 1450 from the HDD 1400 and executes the program data, but may acquire those programs from another device via the external network 1550 as another example.

The present technology can also have the following configurations.

(1)

An information processing device comprising:
  a display control unit configured to display a content image on a head-mounted display; and
  a decision unit configured to, during display of the content image by the display control unit, decide whether or not a surrounding person exists in a front direction of the head-mounted display on the basis of a camera image obtained by capturing an image of a surrounding environment of the head-mounted display, wherein
  the display control unit
  moves a display position of the content image in a case where the decision unit decides that the surrounding person exists.

(2)

The information processing device according to (1), wherein
  the head-mounted display
  has optical transmissivity.

(3)

The information processing device according to (2), wherein
  the head-mounted display
  includes a light shielding member.

(4)

The information processing device according to any one of (1) to (3), wherein
  the display control unit
  moves the content image such that a distance between initial coordinates and a center of the content image increases, the initial coordinates being set at a center of a display region of the head-mounted display.

(5)

The information processing device according to any one of (1) to (4), wherein
  in a case of moving the display position of the content image,
  the display control unit moves the display position such that a moving speed of the content image is equal to or less than a predetermined value.

(6)

The information processing device according to any one of (1) to (5), wherein
  in a case of moving the display position of the content image,
  the display control unit moves the display position such that a distance between the display position before the movement and the display position after the movement falls within a predetermined range.

(7)

The information processing device according to any one of (1) to (6), further comprising
  a calculation unit configured to calculate an amount of change in a posture of the head-mounted display before and after the movement of the content image on the basis of a posture signal regarding the posture of the head-mounted display, wherein
  the display control unit
  returns the display position of the content image to an original position in a case where the amount of change in the posture calculated by the calculation unit exceeds a threshold.

(8)

The information processing device according to (7), wherein:
  the calculation unit
  calculates an amount of rotation of a head of a wearer of the head-mounted display as the amount of change on the basis of the posture signal; and
  the display control unit
  returns the display position of the content image to the original position in a case where the amount of rotation exceeds a threshold.

(9)

The information processing device according to any one of (1) to (8), wherein
  the decision unit
  decides whether or not the surrounding person exists on the basis of a direction of a face of a person existing in the front direction of the head-mounted display.

(10)

The information processing device according to (9), wherein
  the decision unit
  decides that the surrounding person exists in a case where an angle between the front direction of the head-mounted display and the direction of the face of the person is equal to or less than a predetermined threshold.

(11)
The information processing device according to any one of (1) to (10), wherein
the decision unit
decides that the surrounding person exists in a case where the surrounding person stops for a predetermined period of time or more in the front direction of the head-mounted display.

(12)
The information processing device according to any one of (1) to (11), wherein
the decision unit
decides that the surrounding person exists in a case where a distance between the front direction of the head-mounted display and coordinates of a specific part of the surrounding person is equal to or less than a threshold.

(13)
The information processing device according to any one of (1) to (12), further comprising
a determination unit configured to, in a case where the decision unit decides that the surrounding person exists, determine a destination of the display position of the content image on the basis of the camera image.

(14)
The information processing device according to (13), wherein
the determination unit
determines the destination of the display position of the content image on the basis of a direction of a person appearing in the camera image.

(15)
The information processing device according to (13) or (14), wherein
the determination unit
determines the destination of the display position of the content image in a direction in which there is no person appearing in the camera image.

(16)
The information processing device according to any one of (13) to (15), wherein
the determination unit
determines the destination of the display position in a direction of a feature object that satisfies a visual condition indicating a visual feature among objects appearing in the camera image.

(17)
An information processing method comprising
causing a computer to
display a content image on a head-mounted display,
during display of the content image, decide whether or not a surrounding person exists in a front direction of the head-mounted display on the basis of a camera image obtained by capturing an image of a surrounding environment of the head-mounted display, and
move a display position of the content image in a case where it is decided that the surrounding person exists.

(18)
An information processing program for causing a computer to function as
a display control unit configured to display a content image on a head-mounted display, and
a decision unit configured to, during display of the content image by the display control unit, decide whether or not a surrounding person exists in a front direction of the head-mounted display on the basis of a camera image obtained by capturing an image of a surrounding environment of the head-mounted display, wherein
the display control unit
moves a display position of the content image in a case where the decision unit decides that the surrounding person exists.

REFERENCE SIGNS LIST

1 INFORMATION PROCESSING DEVICE
10 DISPLAY DEVICE
30 ACQUISITION UNIT
31 DECISION UNIT
32 DETERMINATION UNIT
33 CALCULATION UNIT
34 DISPLAY CONTROL UNIT
Rp INITIAL COORDINATES
C CENTER COORDINATES

The invention claimed is:

1. An information processing device, comprising:
a display control unit configured to display a content image on a head-mounted display;
a decision unit configured to, during display of the content image by the display control unit, decide whether a surrounding person exists in a front direction of the head-mounted display based on a camera image obtained by capturing an image of a surrounding environment of the head-mounted display, wherein
the display control unit moves a display position of the content image in a case where the decision unit decides that the surrounding person exists; and
a calculation unit configured to calculate an amount of change in a posture of a wearer of the head-mounted display before and after the movement of the content image based on a posture signal regarding the posture of the wearer of the head-mounted display, wherein
the display control unit returns the display position of the content image to an original position in a case where the amount of change in the posture calculated by the calculation unit exceeds a first threshold.

2. The information processing device according to claim 1, wherein
the head-mounted display has optical transmissivity.

3. The information processing device according to claim 2, wherein
the head-mounted display includes a light shielding member.

4. The information processing device according to claim 1, wherein
the display control unit moves the content image such that a distance between initial coordinates and a center of the content image increases, the initial coordinates being set at a center of a display region of the head-mounted display.

5. The information processing device according to claim 1, wherein
in a case of moving the display position of the content image, the display control unit moves the display position such that a moving speed of the content image is equal to or less than a predetermined value.

6. The information processing device according to claim 1, wherein
in a case of moving the display position of the content image, the display control unit moves the display position such that a distance between the display position before the movement and the display position after the movement falls within a predetermined range.

7. The information processing device according to claim 1, wherein:
the calculation unit calculates an amount of rotation of a head of the wearer of the head-mounted display as the amount of change based on the posture signal; and
the display control unit returns the display position of the content image to the original position in a case where the amount of rotation exceeds the first threshold.

8. The information processing device according to claim 1, wherein
the decision unit decides whether the surrounding person exists based on a direction of a face of a person existing in the front direction of the head-mounted display.

9. The information processing device according to claim 8, wherein
the decision unit decides that the surrounding person exists in a case where an angle between the front direction of the head-mounted display and the direction of the face of the person is equal to or less than a second threshold.

10. The information processing device according to claim 1, wherein
the decision unit decides that the surrounding person exists in a case where the surrounding person stops for a predetermined period of time or more in the front direction of the head-mounted display.

11. The information processing device according to claim 1, wherein
the decision unit decides that the surrounding person exists in a case where a distance between the front direction of the head-mounted display and coordinates of a specific part of the surrounding person is equal to or less than a third threshold.

12. The information processing device according to claim 1, further comprising
a determination unit configured to, in a case where the decision unit decides that the surrounding person exists, determine a destination of the display position of the content image based on the camera image.

13. The information processing device according to claim 12, wherein
the determination unit determines the destination of the display position of the content image based on a direction of a person appearing in the camera image.

14. The information processing device according to claim 12, wherein
the determination unit determines the destination of the display position of the content image in a direction in which there is no person appearing in the camera image.

15. The information processing device according to claim 12, wherein
the determination unit determines the destination of the display position in a direction of a feature object that satisfies a visual condition indicating a visual feature among objects appearing in the camera image.

16. An information processing method, comprising
displaying a content image on a head-mounted display;
deciding, during display of the content image, whether a surrounding person exists in a front direction of the head-mounted display based on a camera image obtained by capturing an image of a surrounding environment of the head-mounted display;
moving a display position of the content image in a case where it is decided that the surrounding person exists;
calculating an amount of change in a posture of a wearer of the head-mounted display before and after the movement of the content image based on a posture signal regarding the posture of the wearer of the head-mounted display; and
returning the display position of the content image to an original position in a case where the amount of change in the posture exceeds a threshold.

17. A non-transitory computer-readable medium having stored thereon, computer-executable instructions which, when executed by a computer, cause the computer to execute operations, the operations comprising:
displaying a content image on a head-mounted display;
deciding, during display of the content image, whether a surrounding person exists in a front direction of the head-mounted display based on a camera image obtained by capturing an image of a surrounding environment of the head-mounted display;
moving a display position of the content image in a case where it is decided that the surrounding person exists;
calculating an amount of change in a posture of a wearer of the head-mounted display before and after the movement of the content image based on a posture signal regarding the posture of the wearer of the head-mounted display; and
returning the display position of the content image to an original position in a case where the amount of change in the posture exceeds a threshold.

\* \* \* \* \*